United States Patent [19]

Lange

[11] 4,272,678
[45] Jun. 9, 1981

[54] GAMMA RAY CAMERA USING A CHANNEL AMPLIFIER

[75] Inventor: Kai Lange, Strandvej, Denmark

[73] Assignee: General Electric Company, Schenectady, N.Y.

[21] Appl. No.: 86,979

[22] Filed: Oct. 22, 1979

[51] Int. Cl.³ .............................. G01T 1/20; G01T 1/00
[52] U.S. Cl. ................................. 250/363 S; 250/368; 250/483
[58] Field of Search ............... 250/363 S, 361 R, 483, 250/368, 213 VT, 369

[56] References Cited

U.S. PATENT DOCUMENTS

| 3,267,283 | 8/1966 | Kapany | 250/227 |
| 3,971,942 | 7/1976 | Seidman et al. | 250/363 S |
| 4,142,101 | 2/1979 | Yin | 250/483 |

FOREIGN PATENT DOCUMENTS 7214157  4/1973  Netherlands ..................... 250/361 R

OTHER PUBLICATIONS

Shafrir et al., "A Proposal for a Combined Scintillation-Image-Intensifer Section for Application in Gamma Camera", Nuc. Inst. & Methods, 136 (2), 7-15-76, pp. 399-400.
Shafrir et al., "Novel Gamma Cameras", ISPRA Sym., Stresa, Italy, 5-20-75, Nuc. Sci. Abs., vol. 33, 5-15-76, #20261.
Conrad et al., "The Scinticon, A New Gamma-Camera", Electromedea, vol. 4, 5-73; pp. 220-225.

Primary Examiner—Alfred E. Smith
Assistant Examiner—Carolyn E. Fields
Attorney, Agent, or Firm—Wheeler, House, Fuller & Hohenfeldt

[57] ABSTRACT

In a gamma camera, to improve resolution, primary scintillations resulting from absorption of gamma ray photons in a scintillator crystal are intercepted by the input face of a channel amplifier plate in which the primary scintillations excite a photocathode to emit electrons which are multiplied in the respective channels and reconverted to secondary scintillations in a phosphorescent output screen from which the brighter secondary scintillations are coupled to an array of photodetectors which produce signals that are used to determine the x and y coordinates of the scintillations. The secondary scintillation positions correspond with the primary scintillations in the crystal because the channels keep them aligned.

5 Claims, 3 Drawing Figures

GAMMA RAY CAMERA USING A CHANNEL AMPLIFIER

This invention relates to scintillation cameras which are commonly called gamma cameras. The invention is concerned with preamplifying the scintillations after they occur in the scintillation crystal and before they are intercepted by the plurality of photodetectors that produce the signals which are used for calculating the position at which each scintillation occurs.

In nuclear medicine, scintillation cameras are used to detect gamma ray or other high energy photons emitted from a body in which a radioisotope has been infused. The photons are emitted in correspondence with the extent to which the isotope is absorbed by body tissue under examination. Most gamma cameras now in use have the basic features of the well-known Anger gamma camera which is disclosed in U.S. Pat. No. 3,011,057. In connection with this type of camera, the gamma ray photons emitted from the radioisotope infused body tissue are absorbed in a plate of crystalline material and a scintillation occurs at the point of absorption. The points of absorption are substantially congruent with the points from which the photons are emitted, except for photons which are scattered in the body, since the photons are directed to the crystal with a collimator comprising a lead plate having a plurality of parallel holes. An array of photodetectors such as semiconductor detectors or photomultiplier (PM) tubes, generally hexagonally arranged, are optically coupled to the scintillation crystal so that each photodetector will produce an output signal whose magnitude depends on its particular geometrical relationship to the scintillation event being detected. Each photodetector intercepts light photons from each scintillation event to an extent depending upon its distance and angular relationship to the point in the crystal where the scintillation event occurs and each photodetector produces an analog output pulse corresponding in amplitude with the intensity of the scintillation intercepted by it. As is well-known, these output signals are simultaneously supplied to circuitry which computes the x and y coordinates of each scintillation event and provides signals for controlling the position of a cathode ray display tube beam correspondingly. The simultaneously produced pulses are summed and subjected to pulse height analysis. If the total energy of the pulses falls within the energy window of the analyzer, a z pulse is caused to be produced. The z pulses are used to unblank the electron beam of a cathode ray tube display such that a brightness change is made or written at the coordinate point on the display tube screen which desirably corresponds with the true coordinates of the scintillation event. The points of light are integrated on a photographic film to form an image.

In gamma cameras the limiting factor for good image resolution is the low number of photons produced and the related statistical fluctuations. Because of weighting, the statistical fluctuations are emphasized. This results in the calculated x and y coordinates of the event being less accurate so the resolution of the camera is degraded.

Poor signal-to-noise ratio is another problem and several different approaches have been made to solve it. One is to use threshold amplifiers for limiting the effect on one photodetector of signals from other photodetectors that result from fluctuations in photoelectrons. Another approach is discussed in U.S. Pat. No. 4,090,081 where laminated scintillator crystals having roughened outer faces and roughed interfaces are used to diffuse or deflect light rays selectively so those rays which are not on the proper course to the photomultiplier tube are at least partially eliminated.

SUMMARY OF THE INVENTION

An object of the present invention is to attack the signal-to-noise problem at its roots by enhancing the brightness of the scintillations after they occur in the scintillator and before they are intercepted by the photodetectors to thereby make the system less susceptible to statistical fluctuations in photoelectron production which occur in the scintillator itself.

An important object is to amplify the light scintillations without losing information as to their exact locations. Stated in another way, the objective is to produce a secondary brightness amplified small scintillation area directly over the primary scintillation in the crystal and then after amplification, let it be intercepted by an array of fewer than usual photodetectors for calculating the coordinates or location of the primary scintillation.

Another object is to enable using fewer photodetectors than has been customary heretofore.

In accordance with the invention, a channel amplifier plate is interposed between the scintillator crystal and the photomultiplier tubes or whatever type of photodetectors are used. The channel amplifier plate has a photocathode, comprised of a coating of photoemissive material, on its input face and a phosphorescent screen coated on its output face, that is, on the face which is presented toward the photodetectors. The channel amplifier plate is composed of a mosaic of parallel insulating tubes whose internal bores or channels are electron emissive. An electron accelerating voltage is applied between opposite faces of the plate and, hence, to opposite ends of the tubes. The input face of the amplifier plate having the photocathode intercepts light scintillation coming directly from the scintillator due to gamma photon absorption events. The intercepted scintillations excite the photocathode to emit some electrons which are multiplied in the affected tubes and then absorbed in the phosphorescent screen to produce a small area light spot positionally corresponding with the scintillation in the crystal but very much brighter.

Those skilled in the art will see the merits of the combination. Because of the increased brightness of the amplified scintillations, an opportunity is afforded for reducing the number of photomultiplier tubes or other photodetectors below the number which are now generally used in Anger type cameras. Signal-to-noise ratio and resolution are improved. Very importantly too, the amplified light spots on the phosphorescent screen remain in true alignment with the scintillations in the crystal and the photomultiplier tubes sense the light spots or points as if they were looking directly at the scintillation.

A more detailed discussion of how the invention is implemented will now be set forth in reference to the drawing.

DESCRIPTION OF A PREFERRED EMBODIMENT

Figure 1:
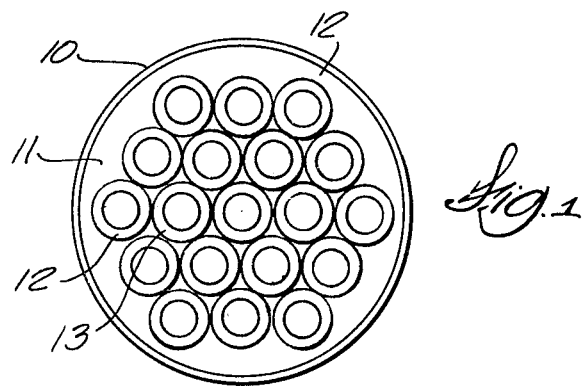
FIG. 1 is a diagrammatic plan view of a gamma camera which incorporates a channel amplifier plate for intensifying the brightness of scintillations.
Figure 2:
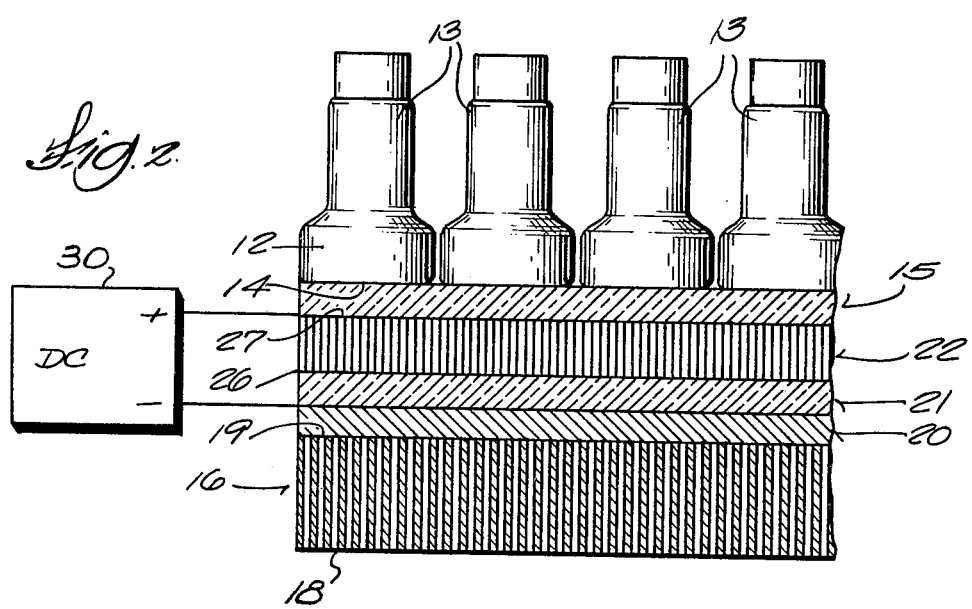
FIG. 2 is a diagrammatic partial vertical section taken through FIG. 1.

Referring to FIG. 1, the gamma camera comprises a cylindrical body 10 enclosed on its top with a glass light interface disc 11. Mounted on glass disc 11 are a plurality of photodetectors which, in this example, are photomultiplier (PM) tubes represented by circles, some of which are identified by the reference numerals 12 and 13. In this particular example, a total of 19 PM tubes are used. In some conventional cameras, as many as 37 tubes are used and in some fewer than 19 tubes have been used. In any event, the PM tubes perform in a conventional way by transforming light received through their glass input faces 14, as shown in FIG. 2, into electric pulses which are generally proportional in amplitude to the brightness or photon intensity of the scintillations which are optically coupled to the tubes. It should be understood that semiconductor-based photodetectors could be used in place of the PM tubes, silicon cells being one example. However, for the sake of convenience and brevity and because PM tubes are illustrated and are currently used most widely, the term PM tube will be used in this description to signify any suitable photodetector which might be used.

The input faces 14 of the PM tubes rest on a glass plate 15 which serves as a light interface or optical coupling to the tubes.

The gamma camera shown in FIG. 2 has some of the features of prior art cameras in addition to the known features which were mentioned in the preceding paragraph. For instance, in its lowermost region, the camera is provided with a collimator 16 which is basically a lead plate having a mosaic of small parallel holes that extend from its lower face 18 to its upper face 19. A body, not shown, which has been infused with a radioactive isotope or gamma ray emitter, would be located near the lower surface 18 of the collimator when the camera is in use. The holes, of course, assure that the energetic gamma ray photons will be directed in straight line paths upwardly toward the PM tubes.

A disc 20 of a known crystalline scintillating material such as thallium-activated sodium iodide interfaces with the top surface 19 of collimator 16. Gamma ray photons which pass through collimator 16 cause scintillations to occur in scintillator crystal 20 wherever a gamma ray photon having sufficient energy is absorbed.

A glass plate 21 rests on top of scintillator crystal 20 and serves as a means for optically coupling the scintillations with a scintillation or light amplifier which is generally designated by the reference numeral 22 in FIG. 2 and is a new feature in a gamma camera. Light amplifier 22 comprises a plate composed of a multiplicity of parallel electron multiplier channels so the light amplifier will be characterized by its more descriptive name, channel amplifier 22, hereinafter. Channel amplifier 22 intercepts the primary scintillations from scintillator 20 and is operative to amplify their brightness before they are optically coupled by way of glass plate 15 to the input faces 14 of the PM tubes such as 12 and 13.

Figure 3:
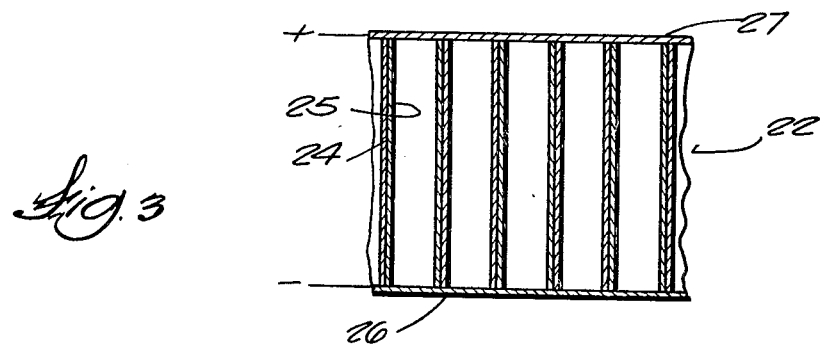
FIG. 3 is a magnified fragment of the channel amplifier plate used in the camera depicted in the previous figures.

An enlarged fragmentary vertical section of channel amplifier 22 is shown in FIG. 3. It comprises a mosaic of short parallel glass tubes 24 which are bonded together to form a plate. The bores of the tubes are called channels. The internal surfaces 25 of the bores are treated so they emit a quantity of secondary electrons in response to being impinged by a lesser quantity of sufficiently energetic electrons. In this case, the lower surface of the channel plate is coated with a photoemissive substance, shown in exaggerated thickness and marked with the numeral 26. The photoemissive layer 26 is coated, by vacuum deposition for example, with a metallic or other conductive material film which is thin enough to be light transmissive. The photoemissive layer in conjunction with the conductive film constitutes a photocathode. The photocathode is the input end of the channel amplifier. The photoemissive layer emits electrons into a glass tube wherever it absorbs light photons from a scintillation in scintillator crystal 20.

The upper surface of the channel amplifier plate is overlayed with a thin phosphorescent screen 27 which, when it absorbs sufficiently energetic electrons that are propagated and multiplied in the glass tubes, produces light photons or manifested by small area light spots whose brightness depends largely on the quantity and energy of the electrons which are absorbed in phosphorescent screen 27. Screen 27 also has a thin conductive film formed on it so it can be connected as an anode. The diameter or width of the channel amplifier plate should, of course, be about equal to the diameter of the collimator.

As can be seen in FIG. 2, an electron accelerating voltage is applied between photocathode 26 and anodic phosphorescent screen 27 by means of a d-c power supply which is symbolized by the block marked 30. The negative output terminal of this power supply is connected to photocathode 26 and the positive output terminal is connected to phosphorescent screen 27 by means of its thin light transparent conductive layer. Thus, a potential gradient is established between the upper anode and lower cathode faces of the channel amplifier 22.

Scintillations or light photons emerging from scintillator 21 which are intercepted by and absorbed in photocathode 26 in FIG. 3 cause emission of a relatively small number of electrons at the lower interior ends of the channel tubes 25 which are treated interiorly to be photoemissive. Because of the voltage applied between the light input photocathode face 26 and anode or amplifier light output face 27 of the electron emissive channels, the electrons are accelerated along and repeatedly strike the channel walls, thereby producing more and more free electrons by secondary emission. The electrons resulting from this multiplication process, of course, strike the output phosphorescent screen 27 and are converted to light having an intensity much greater than the intensity of the primary light photons which emerge from the scintillator and impinge on the photocathode of a particular channel. These amplified output scintillations are coupled from phosphorescent screen 27 to the input faces 14 of the photodetectors such as the PM tubes 12 and 13 and the others.

The voltage applied between photocathode 26 and the anode electrode on screen 27 of the channel amplifier by means of a d-c supply 30 should preferably be adjustable. Generally, voltages in the range of 750 to 1200 volts are used, with about 1000 volts being most common, but the applied voltage may be higher or lower depending on the diameter and length of the channels and the degree of light amplification required.

The bore size of the glass tubes 24 which comprise the channel amplifier plate can be as small as channel amplifier manufacturing technology permits them to be made. In some prior uses of channel amplifier plates, such as in light amplifying binoculars, telescopes and other image intensifying devices, the glass tube bores or channels are as small as 25 micrometers in diameter and they often have a length 10 to 60 times greater than the diameter. For the gamma camera application described herein, however, the diameter of the channels can be larger which makes it easier and less costly to manufacture the plates. Although the permissible upper limit diameter of the internally photoemissive tubes has not been established as yet for the gamma camera application, it is projected that the limit might be about 3 mm without jeopardizing image resolution. The axial length of the tubes and, hence, the thickness of the plate is governed to some extent by the desire to minimize fragility of the large diameter channel amplifier plate. The choice of length also depends on other factors in a particular manufacturer's camera design which will be evident to those skilled in the gamma camera art. Roughly, for the sake of an example and not as a limitation, tube lengths and, hence, plate thicknesses in the range of 2.5 mm to 10 mm are illustrative.

It should be evident to those skilled in the art that with the scintillations having their brightness greatly intensified by the channel amplifier, the number of photodetectors can be reduced below the minimum number of 19 or more which are now commonly used and that the photodetectors need not be closely packed. It is foreseeable that the number of photodetectors may be reduced as far as down to four photodetectors. It will be evident that the number of electronic signal processing channels can be reduced proportionally. By applying an electron accelerating voltage of about 100 volts to the channel amplifier as contemplated herein, average gains in light intensity can be 1000 to 10,000 times the intensity of the original or primary scintillations in the scintillator crystal and, most advantageously, the bright light spots which appear on the output phosphorescent screen of the channel amplifier are exactly congruent to the primary scintillations so increased brightness is not obtained to the detriment of image resolution.

The housing for the composite collimator, light coupling interfaces and the channel amplifier mosaic has not been shown in the drawing for the sake of simplification and because those skilled in the gamma camera art can easily devise a suitable housing. It should be noted, however, that greater care must be taken to exclude moisture and hydrocarbon contaminants in a gamma camera which uses a channel or electron multiplier type of light preamplifier than is required in gamma camera designs which are now in use.

Although an embodiment of the invention has been described in considerable detail, such description is intended to be illustrative rather than limiting, for the invention may be variously embodied and is to be limited only by interpretation of the claims which follow.

I claim:

1. A scintillation camera having means for amplifying the brightness of scintillations, comprising:
    an array of photodetector devices for producing electric signals in response to intercepting scintillations,
    a planar homogeneous unitary scintillator element spaced from said photodetector devices and responsive to absorption of gamma ray photons by producing primary scintillations where photons are absorbed,
    the means for amplifying the brightness of the primary scintillations comprising a channel amplifier plate extending transversely to the path between said planar scintillator element and said photodetector array and being composed of a plurality of elements having electron emissive internal channels for receiving electrons and for multiplying electron current,
    a photocathode layer disposed at corresponding ends of said channel elements at a face of said plate which is presented toward said scintillator element for emitting electrons into said channels in response to absorption of photons corresponding with primary scintillations from said scintillator,
    a phosphorescent screen layer disposed at corresponding ends of said channels at a face of said plate which is presented toward said photodetector array and responsive to absorption of multiplied electrons by producing brightened scintillations corresponding with said primary scintillations, and
    means for connecting opposite ends of said channels to a source of d-c voltage for propagating said electrons from the photocathode through the channels,
    a plate of transparent material interposed between said planar scintillator element and said photocathode layer for coupling said primary scintillations in said scintillator to said photocathode layer, and
    a plate of transparent material interposed between said phosphorescent screen means and said array of photodetectors for coupling the brightened scintillations on said screen to said photodetectors.

2. The camera as claimed in claim 1 including:
    collimator means composed of gamma ray shielding material having a plurality of adjacent passageways for directing gamma ray photons toward said scintillation element in straight paths.

3. The camera as claimed in claim 1 wherein said photodetector devices are photomultiplier tubes.

4. The camera as in claim 1 wherein the diameter of said channels is no greater than about 3 millimeters.

5. The camera as in claim 1 wherein the number of photodetectors used is between 4 and 19.

* * * * *